(12) United States Patent
Aotake et al.

(10) Patent No.: US 9,518,890 B2
(45) Date of Patent: Dec. 13, 2016

(54) MOBILE TERMINAL DEVICE AND SEALING DETECTION METHOD

(71) Applicant: FUJITSU LIMITED, Kawasaki-shi, Kanagawa (JP)

(72) Inventors: Yusuke Aotake, Kawasaki (JP); Yoshinori Yuki, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/474,689

(22) Filed: Sep. 2, 2014

(65) Prior Publication Data

US 2015/0070180 A1   Mar. 12, 2015

(30) Foreign Application Priority Data

Sep. 6, 2013   (JP) .................................. 2013-185356

(51) Int. Cl.
| | |
|---|---|
| *G01M 3/26* | (2006.01) |
| *G08B 21/18* | (2006.01) |
| *H04B 1/38* | (2015.01) |
| *H04M 1/18* | (2006.01) |
| *H04B 1/3888* | (2015.01) |
| *G06F 1/16* | (2006.01) |

(52) U.S. Cl.
CPC .............. *G01M 3/26* (2013.01); *G08B 21/182* (2013.01); *H04B 1/3888* (2013.01); *H04M 1/18* (2013.01); *G06F 1/1656* (2013.01); *H04B 2001/3894* (2013.01); *H04M 2250/12* (2013.01)

(58) Field of Classification Search
CPC .................... H04B 2001/3894; H04B 1/3888; G01M 3/26; G08B 21/182; G06F 1/1656; H04M 1/18
See application file for complete search history.

(56) References Cited

U.S. PATENT DOCUMENTS

| | | | |
|---|---|---|---|
| 2012/0243854 A1* | 9/2012 | Takimoto ............ | G01M 3/3272 396/26 |
| 2014/0238353 A1* | 8/2014 | Brown ................... | F02M 51/06 123/458 |

FOREIGN PATENT DOCUMENTS

JP      2000-216555 A      8/2000

\* cited by examiner

*Primary Examiner* — Hongmin Fan
(74) *Attorney, Agent, or Firm* — Westerman, Hattori, Daniels & Adrian, LLP

(57) ABSTRACT

A mobile terminal device includes: a housing; a measuring unit configured to measure an air pressure inside the housing; a detecting unit configured to detect whether the housing is sealed based on a change in the air pressure measured by the measuring unit while an operation is being conducted by a user; and a notifying unit configured to notify the user of a detection result of the detecting unit.

7 Claims, 11 Drawing Sheets

MOBILE TERMINAL DEVICE AND SEALING DETECTION METHOD

CROSS-REFERENCE TO RELATED APPLICATION

This application is based upon and claims the benefit of priority from the prior Japanese Patent Application No. 2013-185356 filed on Sep. 6, 2013, the entire contents of which are incorporated herein by reference.

FIELD

The embodiments discussed herein relate to a mobile terminal device and a sealing detection method.

BACKGROUND

Mobile terminal devices having a waterproofing function are conventionally known among mobile terminal devices. In order to reduce the intrusion of water into the inside of a housing, such mobile terminal devices are provided with water proof caps that are openable and closeable for battery lids, earphone or charging terminals, Universal Serial Bus (USB) terminals, or various types of memory card insertion terminals.

In this case, the mobile terminal device may be damaged when immersed in water if the waterproofing function is not demonstrated when the water proof caps for the battery lid or for the various terminals are not fitted securely. Accordingly, the mobile terminal device issues a warning to a user to securely fit the waterproof caps for the battery lid or for the various terminals with a seal applied to the screen display or the housing.

Japanese Laid-open Patent Publication No. 2000-216555 is an example of related art.

SUMMARY

According to an aspect of the invention, a mobile terminal device includes: a housing; a measuring unit configured to measure an air pressure inside the housing; a detecting unit configured to detect whether the housing is sealed based on a change in the air pressure measured by the measuring unit while an operation is being conducted by a user; and a notifying unit configured to notify the user of a detection result of the detecting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The conventional mobile terminal device issues a warning to the user to securely fit the battery lid or the water proof caps of the terminals. And the conventional mobile terminal relies on touch as to whether the battery lid or the water proof caps of the terminals are securely fitted or not when the user fits the waterproof caps on. Accordingly, it is difficult to determine whether the waterproof caps are securely fitted or not. As a result, when, for example, foreign matter is adhered to the waterproof cap, the waterproofing function is not demonstrated since a gap is present even if the waterproof cap seems to be fitted onto the housing, and therefore damage may occur to the mobile terminal device if immersed in water.

Embodiments of a mobile terminal device and a sealing detection method that are able to notify a user whether a waterproof cap is securely fitted are described in detail hereinbelow with reference to the drawings. The following embodiments are not limited to the features disclosed herein. The embodiments may be combined as appropriate within a consistent scope.

First Embodiment

Figure 1:
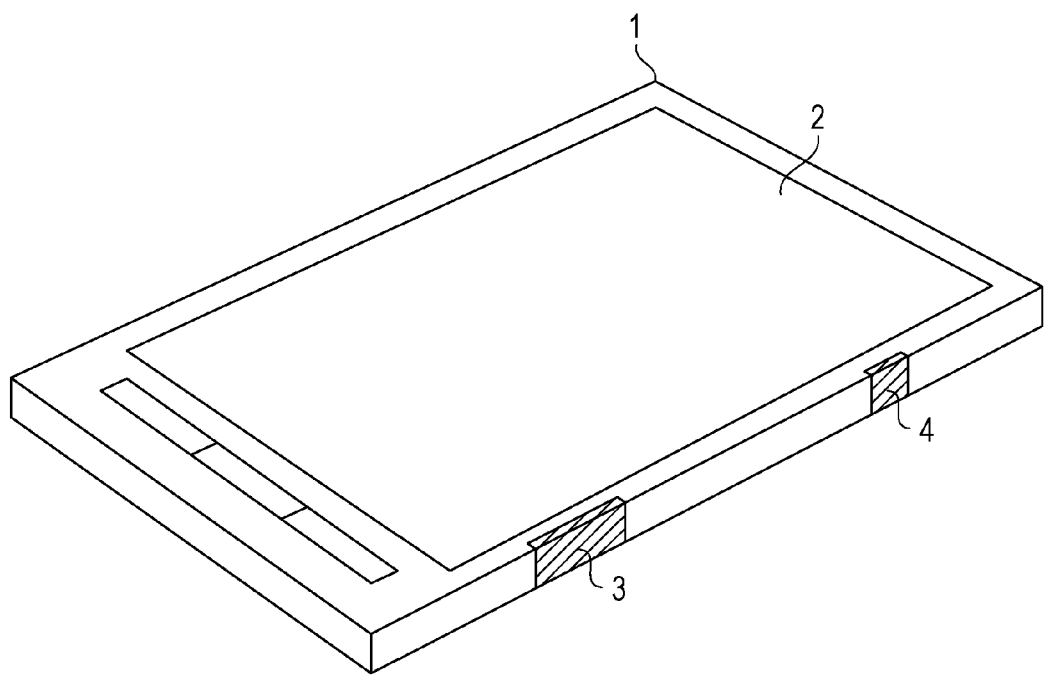
FIG. 1 illustrates an example of a mobile terminal device according to a first embodiment.

A mobile terminal device having a touch panel such as a smartphone or a tablet terminal will be described in the present embodiment as an example of a mobile terminal device disclosed in the present application. FIG. 1 illustrates an example of a mobile terminal device according to a first embodiment. A front side external perspective view of a mobile terminal device 1 according to the first embodiment is depicted in FIG. 1.

As illustrated in FIG. 1, the mobile terminal device 1 has a touch panel 2 and waterproof caps 3 and 4. The mobile terminal device 1 is a smartphone that is connectable to any mobile communication network such as the third generation (3G), 4G, or long-term evolution (LTE) services.

The touch panel 2 is an input/output device attached to a surface of the mobile terminal device 1 and has a liquid crystal panel for displaying various types of information and a touch sensor for detecting touch from a finger of a user and receiving an input operation. For example, the touch panel 2 is an electrostatic capacitive touch panel.

The waterproof caps 3 and 4 are cover members that can be opened and closed by the user and have a waterproofing function. For example, the waterproof cap 3 protects a terminal for connecting a Universal Serial Bus (USB). Further, the waterproof cap 4 protects an insertion terminal (jack) for inserting various types of earphone plugs.

Next, an example of an internal configuration of the mobile terminal device 1 will be explained with FIG. 2. FIG.

2 illustrates an example of an internal configuration of the mobile terminal device according to the first embodiment. A cross-sectional view of the mobile terminal device 1 is depicted in FIG. 2.

Figure 2:
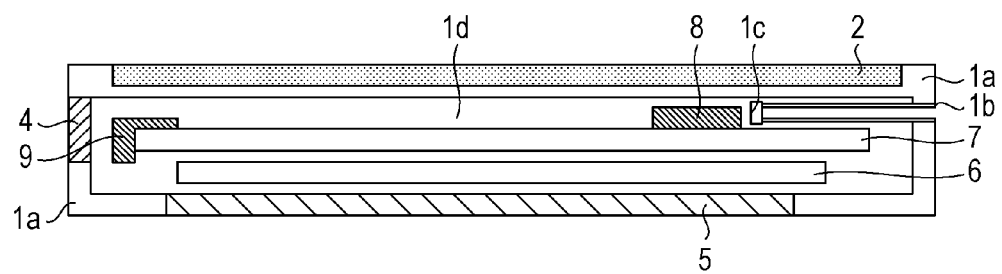
FIG. 2 illustrates an example of an internal configuration of the mobile terminal device according to the first embodiment.

As illustrated in FIG. 2, the mobile terminal device 1 has a housing 1a, a vent hole 1b, a waterproof film 1c, a battery cap 5, a battery 6, a circuit board 7, an air pressure sensor 8, and an external connecting part 9. The housing 1a is a cladding that forms a frame of the mobile terminal device 1 and has a waterproofing function. The vent hole 1b is provided in the housing is and is installed to allow an air pressure of a housing inside 1d to match the air pressure outside of the housing. The waterproof film 1c is a film-like member installed at the housing inside 1d side of the vent hole 1b for reducing the intrusion of water from the vent hole 1b. The waterproof film 1c is a member that has air permeability but reduces the intrusion of a liquid such as water.

The battery cap 5 is a lid member that can be opened and closed when installing or removing the battery 6 and has the same waterproofing function as the waterproof caps 3 and 4. In this way, the mobile terminal device 1 has the housing 1a, the waterproof caps 3 and 4, and the battery cap 5 that all have the waterproofing function and thus reduce the intrusion of water into the housing inside 1d.

The battery 6 is an electric power source device for the mobile terminal device 1. The circuit board 7 is a board on which are installed electronic devices that the mobile terminal device 1 uses to demonstrate various functions. For example, the circuit board 7 has arithmetic processors such as a central processing unit (CPU) or a digital signal processor (DSP), storage devices such as a flash memory, and various input/output (I/O) devices such as the USB terminal.

The air pressure sensor 8 is installed in the mobile terminal device 1 and is, for example, an air pressure sensor used in an altimeter. For example, the mobile terminal device 1 measures the atmospheric pressure in the housing inside 1d that enters a state of equilibrium with the outside of the housing via the vent hole 1b and the waterproof film 1c. The mobile terminal device 1 uses the measurement result to calculate the altitude in which the mobile terminal device 1 is present. The air pressure sensor 8 may be, in addition to the altimeter, an air pressure sensor used by an application for weather forecasting.

The external connecting part 9 is a connector for relaying a connection between the outside of the mobile terminal device 1 and the circuit board 7, and is, for example, an insertion terminal for inserting an earphone plug. When the user inserts an earphone plug into the external connecting part 9 to listen to music, the user uses the mobile terminal device 1 with the waterproof cap 4 in an open state.

Figure 3:
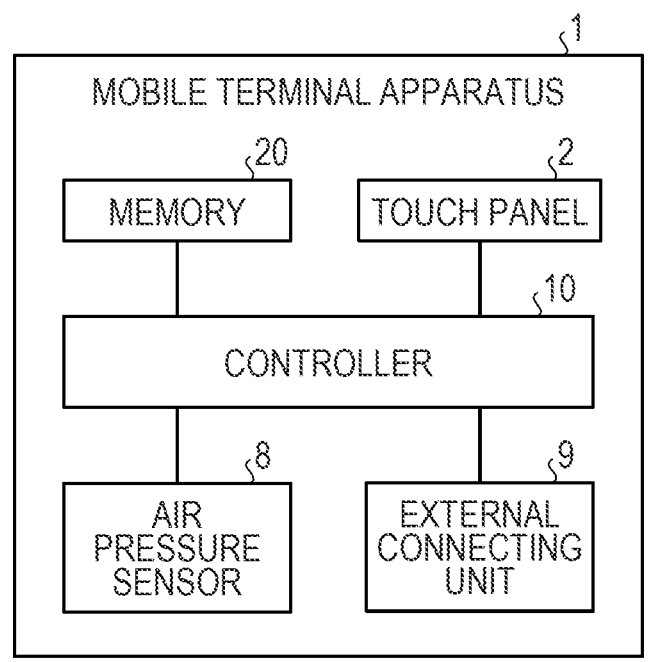
FIG. 3 illustrates a hardware configuration of the mobile terminal device according to the first embodiment.

Next, an example of a hardware configuration of the mobile terminal device 1 will be described with FIG. 3. FIG. 3 illustrates a hardware configuration of the mobile terminal device according to the first embodiment. As illustrated in FIG. 3, the mobile terminal device 1 has a controller 10 connected to the touch panel 2, the air pressure sensor 8, the external connecting part 9, and a memory 20. The controller 10 and the memory 20 are formed on the circuit board 7 depicted in FIG. 2.

The controller 10 executes processing for demonstrating the various functions of the mobile terminal device 1. For example, the controller 10 has an arithmetic processor such as the CPU, the DSP, or a field programmable gate array (FPGA), and controls the operations of the touch panel 2, the air pressure sensor 8, and the external connecting part 9 by executing programs stored in the memory 20.

The memory 20 stores various programs and various thresholds and the like. A synchronous dynamic random access memory (SDRAM), a random access memory (RAM), a read-only memory (ROM), or a flash memory may be considered as examples of the memory 20.

The memory 20 stores a detection program for detecting whether the waterproof caps 3 and 4 and the battery cap 5 in the mobile terminal device 1 are fitted or not. The controller 10 enables the functional configuration illustrated in FIG. 4 by executing a detection program stored in the memory 20.

Figure 4:
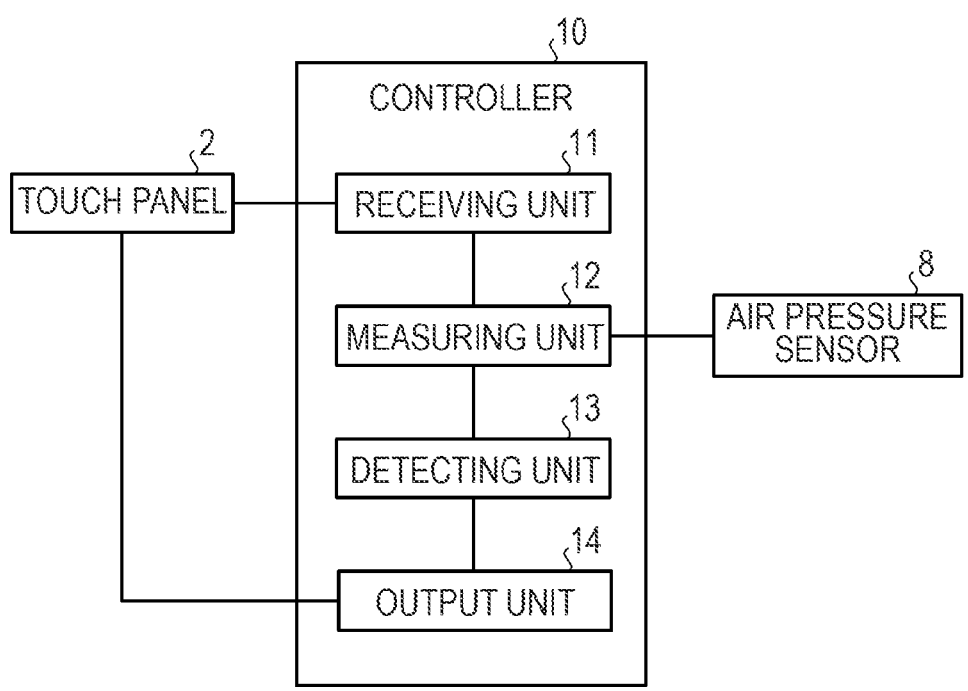
FIG. 4 illustrates a functional configuration of a controller according to the first embodiment.

FIG. 4 illustrates a functional configuration of a controller according to the first embodiment. For example, the controller 10 has a receiving unit 11, a measuring unit 12, a detecting unit 13, and an output unit 14. The receiving unit 11 receives operations from the user via the touch panel 2. The receiving unit 11 notifies the various functions about the contents of the received operation and sends an instruction to the measuring unit 12 to execute an air pressure measuring process upon receiving an operation from the user.

The measuring unit 12 uses the air pressure sensor 8 to measure the air pressure of the housing inside 1d. For example, when the measuring unit 12 is instructed to execute the air pressure measuring process by the receiving unit 11, the measuring unit 12 activates the air pressure sensor 8 to measure the air pressure of the housing inside 1d during a certain time period. That is, the measuring unit 12 measures the air pressure of the housing inside 1d while the user is using the touch panel 2 to operate the mobile terminal device 1. To provide a detailed example, the measuring unit 12 measures the air pressure of the housing inside 1d at a measurement frequency of 1 second intervals. The measuring unit 12 outputs the measurement result to the detecting unit 13 and stops the operation of the air pressure sensor 8.

The detecting unit 13 detects whether the housing inside 1d of the mobile terminal device 1 is sealed based on a fluctuation in the air pressure measured by the measuring unit 12. Specifically, the detecting unit 13 determines that the housing inside 1d of the mobile terminal device 1 is not sealed when the amount of fluctuation of the air pressure measured within the certain time period is smaller than a specific value. Conversely, the detecting unit 13 determines that the housing inside 1d of the mobile terminal device 1 is sealed when the amount of fluctuation of the air pressure measured within the certain time period is greater than the specific value. The detecting unit 13 then notifies the output unit 14 about the determination result.

A mechanism for determining whether the housing inside 1d is sealed based on fluctuation of the air pressure measured by the measuring unit 12 will be described hereinbelow. As illustrated in FIG. 2, the mobile terminal device 1 has the vent hole 1b in order to allow the atmospheric pressure of the housing inside 1d match the atmospheric pressure outside of the housing. However, the mobile terminal device 1 has a configuration for reducing the intrusion of water, such as the waterproof film 1c, for maintaining the waterproofing capability. As a result, when the waterproof caps 3 and 4 and the battery cap 5 are securely fitted and the housing inside 1d is in a sealed state, a certain amount of time is desired for the atmospheric pressure of the housing inside 1d and the atmospheric pressure outside of the housing to reach a state of equilibrium.

Moreover, when the user operates the mobile terminal device 1 via the touch panel 2, the volume of the housing inside 1d changes due to the housing is being bent. Because the mobile terminal device 1 has a limited size, the volume of the housing inside 1d fluctuates by a relatively large proportion. As a result, when the user performs an operation while the waterproof caps 3 and 4 and the battery cap 5 are securely fitted, the atmospheric pressure of the housing inside 1d fluctuates more than the atmospheric pressure outside of the housing. Conversely, if the waterproof caps 3 and 4 and the battery cap 5 are not fitted, the atmospheric pressure of the housing inside 1d does not fluctuate very much even when the user performs an operation since the atmospheric pressure of the housing inside 1d and the atmospheric pressure outside of the housing reach the state of equilibrium instantly.

As a result, the detecting unit 13 is able to determine whether the waterproof caps 3 and 4 and the battery cap 5 are securely fitted in accordance with the fluctuation of the atmospheric pressure in the housing inside 1d when the user operates the mobile terminal device 1. Specifically, the detecting unit 13 is able to determine that the waterproof caps 3 and 4 and the battery cap 5 are not securely fitted when the amount of fluctuation of the air pressure measured while the user is operating the mobile terminal device 1 is less than a specific value.

Any value may be used as the specific value used by the detecting unit 13 in accordance with the stiffness and the size of the mobile terminal device 1. For example, the detecting unit 13 may determine that the waterproof caps 3 or 4 or the battery cap 5 are not securely fitted when the amount of fluctuation of the air pressure per 1 second during a user operation exceeds 5 percent. For example, the detecting unit 13 may use the amount of fluctuation of the air pressure measured by the air pressure sensor 8 in a state in which the waterproof caps 3 or 4 or the battery cap 5 may not be fitted, as the specific value.

Moreover, an amount of fluctuation calculated by any method may be used in accordance with the specific value for comparison as the amount of fluctuation of the air pressure used by the detecting unit 13. For example, the detecting unit 13 may use a difference between a maximum value and a minimum value among air pressure values measured by the air pressure sensor 8 during a certain time period, as the amount of fluctuation of the air pressure. For example, the detecting unit 13 may use a difference among air pressure values measured continuously as the amount of fluctuation of the air pressure.

Examples of air pressure values measured by the air pressure sensor 8 when the waterproof cap 3 is securely fitted and air pressure values measured by the air pressure sensor 8 when the waterproof cap 3 is not securely fitted will be described hereinbelow with reference to FIGS. 5 to 7. In the following explanations, it is assumed that the waterproof cap 4 and the battery cap 5 are fitted normally.

Figure 5:
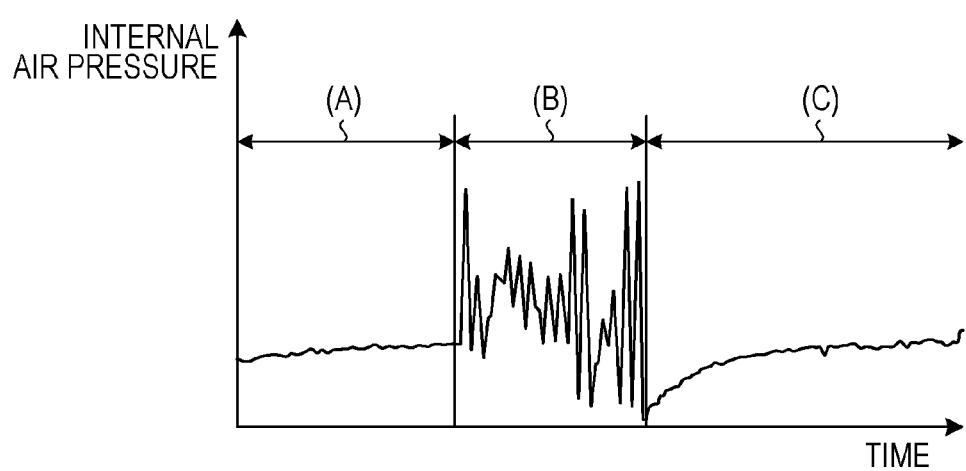
FIG. 5 illustrates changes in internal air pressure during operation when a waterproof cap is fitted normally.

FIG. 5 illustrates changes in internal air pressure during an operation when the waterproof cap is fitted normally. The horizontal axis in FIG. 5 represents time and the vertical axis in FIG. 5 represents the air pressure measured by the air pressure sensor 8 when the waterproof cap 3 is fitted normally as the internal pressure of the housing inside 1d. For example, only a small amount of change in the air pressure of the housing inside 1d occurs in the time period (A) in FIG. 5 since the user is not operating the mobile terminal device 1. However, as illustrated in (B) in FIG. 5, the air pressure of the housing inside 1d exhibits greater change than the time period illustrated by (A) in FIG. 5 when the user operates the mobile terminal device 1. Further, as illustrated in (C) in FIG. 5, the air pressure of the housing inside 1d transitions gradually to the atmospheric pressure when the user has stopped operating the mobile terminal device 1.

Figure 6:
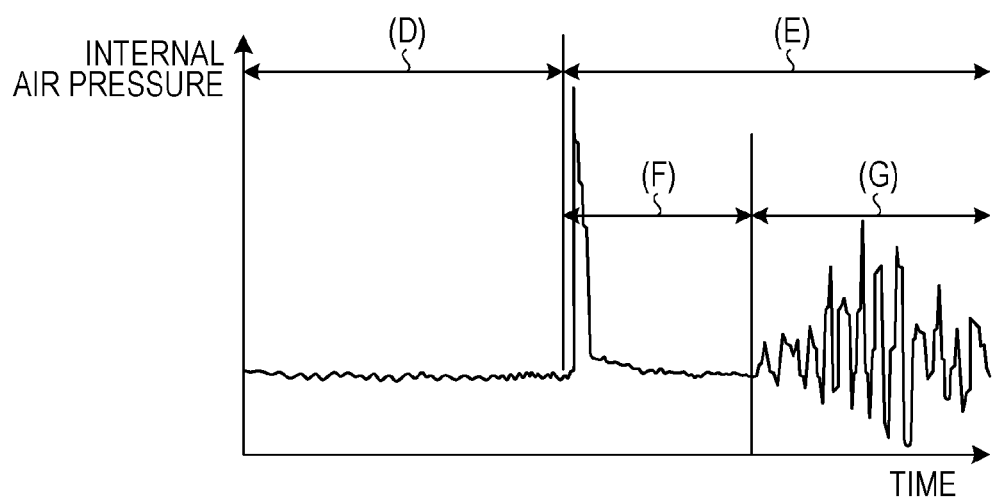
FIG. 6 illustrates changes in internal air pressure when a waterproof cap is fitted normally.

FIG. 6 describes changes in internal air pressure when the waterproof cap is fitted normally. The horizontal axis in FIG. 6 represents time and the vertical axis in FIG. 6 represents the air pressure measured by the air pressure sensor 8 as the internal pressure of the housing inside 1d in the same way as FIG. 5. The air pressure measured by the air pressure sensor 8 when the waterproof cap 3 is open is plotted in (D) in FIG. 6, and the air pressure measured by the air pressure sensor 8 when the waterproof cap 3 is fitted normally is plotted in (E) in FIG. 6.

For example, as illustrated in (D) in FIG. 6, the amount of fluctuation of the air pressure is approximately 0 percent when the waterproof cap 3 is open since air pressure of the housing inside 1d is kept in a state of equilibrium with the atmospheric pressure. As illustrated in (F) in FIG. 6, when the waterproof cap 3 is fitted, the air pressure of the housing inside 1d rises greatly and then transitions to the atmospheric pressure. As illustrated in (G) in FIG. 6, when the user operates the mobile terminal device 1, the air pressure of the housing inside 1d changes greatly in comparison to the time period illustrated in (D) in FIG. 6.

Figure 7:
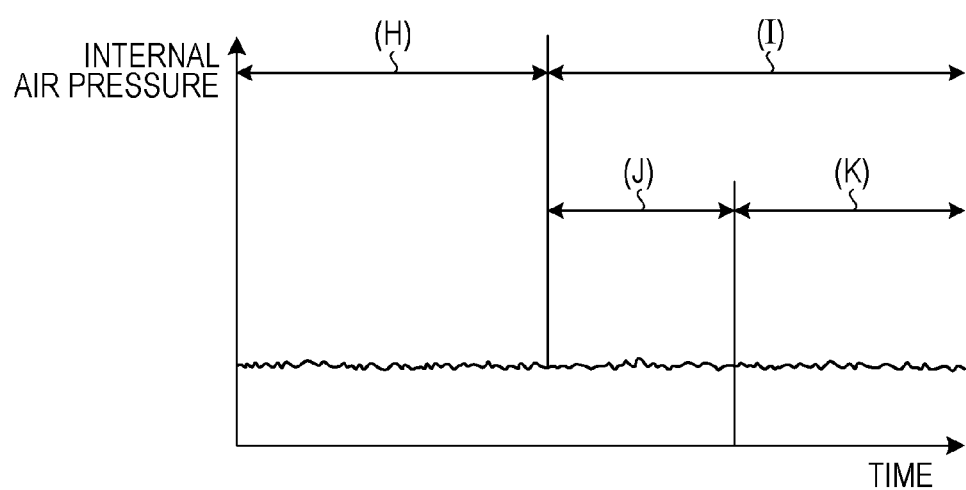
FIG. 7 illustrates changes in internal air pressure when a waterproof cap is fitted abnormally.

FIG. 7 illustrates changes in internal air pressure when the waterproof cap is fitted abnormally. The horizontal axis in FIG. 7 represents time and the vertical axis in FIG. 7 represents the air pressure measured by the air pressure sensor 8 as the internal pressure of the housing inside 1d in the same way as FIG. 5. The air pressure measured by the air pressure sensor 8 when the waterproof cap 3 is open is plotted in (H) in FIG. 7, and the air pressure measured by the air pressure sensor 8 when the waterproof cap 3 is closed but is not fitted normally is plotted in (I) in FIG. 7.

For example, as illustrated in (H) in FIG. 7 when the waterproof cap 3 is open, the air pressure changes very little since the air pressure of the housing inside 1d is kept in a state of equilibrium with the atmospheric pressure. As illustrated in (3) in FIG. 7, when the waterproof cap 3 is closed but is not fitted normally, the air pressure of the housing inside 1d changes very little since air leaks in from gap between the waterproof cap 3 and the housing 1a. As illustrated in (K) in FIG. 7, even if the user operates the mobile terminal device 1, the air pressure of the housing inside 1d changes very little since the air pressure of the housing inside 1d and the atmospheric pressure transition instantly to a state of equilibrium when the waterproof cap is not fitted normally.

In this way, the air pressure sensor 8 measures a larger amount of fluctuation of air pressure than that of the atmospheric pressure during a user operation when the waterproof caps 3 and 4 and the battery cap 5 are fitted normally. Conversely, the air pressure sensor 8 measures the same degree of fluctuation between the atmospheric pressure and the air pressure when the waterproof caps 3 or 4 or the battery cap 5 is not fitted normally. As a result, the detecting unit 13 is able to determine that the waterproof caps 3 and 4 and the battery cap 5 are not fitted normally when the amount of fluctuation of the air pressure measured by the air pressure sensor 8 when the waterproof caps 3 or 4 or the battery cap 5 is open is used as the specific value.

The following explanation returns to FIG. 4. The output unit 14 outputs the determination result from the detecting unit 13 to the touch panel 2 to notify the user the determination result. For example, when the waterproof caps 3 or 4 or the battery cap 5 is determined by the detecting unit 13 as not being fitted normally, the output unit 14 causes the touch panel 2 to display a screen for warning the user that the waterproof cap 3 or 4 or the battery cap 5 is not fitted normally. When the detecting unit 13 determines that the waterproof caps 3 and 4 and the battery cap 5 are fitted normally, the output unit 14 causes the touch panel 2 to display a screen for notifying the user of the determination result.

The output unit 14 may cause the touch panel 2 to display the determination result only when it is determined that the waterproof cap 3 or 4 or the battery cap 5 is not fitted properly. That is, the output unit 14 may issue a warning to the user when the detecting unit 13 determines that the waterproof cap 3 or 4 or the battery cap 5 is not fitted properly.

Figure 8:
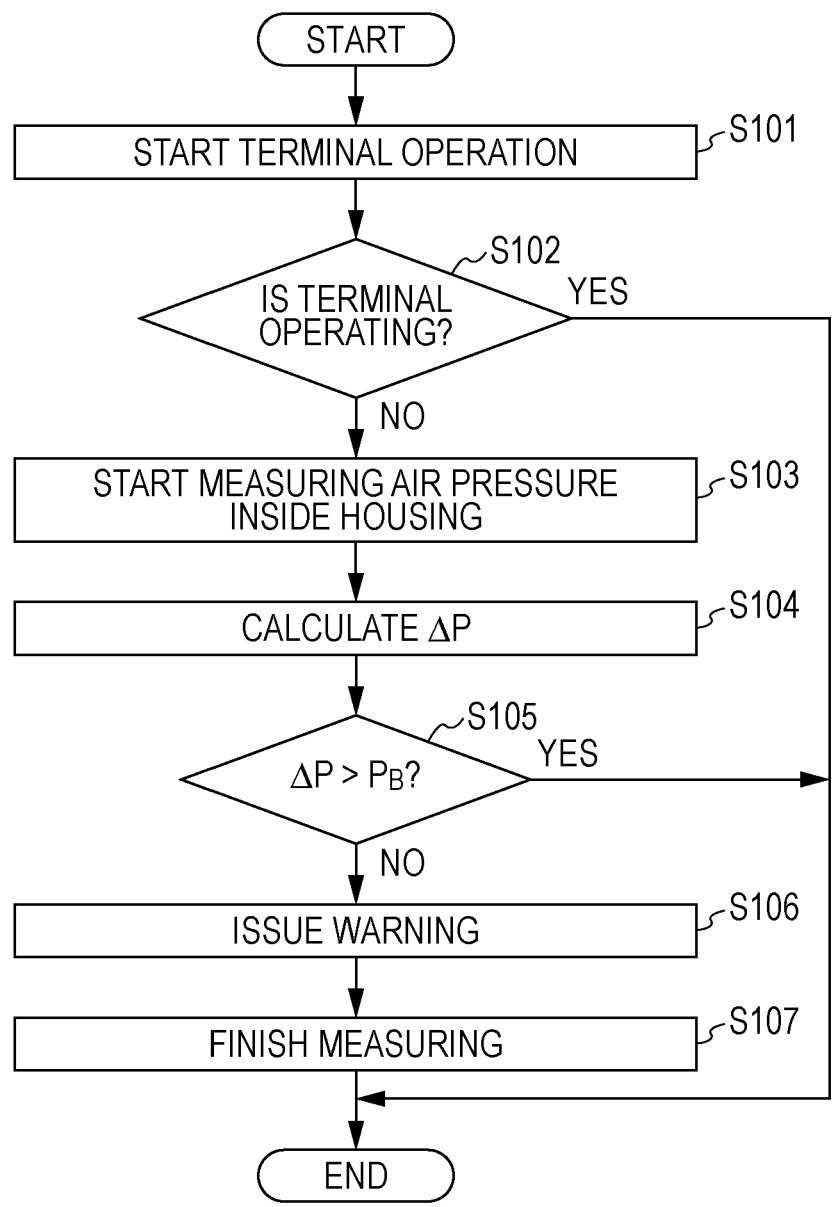
FIG. 8 is a flow chart describing a flow of processing executed by the mobile terminal device according to the first embodiment.

Next, a flow of processing executed by the mobile terminal device 1 will be explained with reference to FIG. 8. FIG. 8 is a flow chart describing a flow of processing executed by the mobile terminal device according to the first embodiment. The mobile terminal device 1 is simply described as a terminal in FIG. 8. For example, the mobile terminal device 1 executes the following processing when an operation is conducted (operation S101).

First, the mobile terminal device 1 determines whether the user is operating the mobile terminal device 1 (operation S102). If it is determined that the mobile terminal device 1 is being operated by the user (operation S102: Yes), the mobile terminal device 1 activates the air pressure sensor 8 to measure the air pressure of the housing inside 1d during a certain period of time (operation S103). The mobile terminal device 1 then calculates an amount of fluctuation $\Delta P$ of the air pressure from the air pressure measured during the certain period of time (operation S104).

Next, the mobile terminal device 1 determines whether the calculated amount of fluctuation $\Delta P$ of the air pressure is larger than a specific value. For example, the mobile terminal device 1 determines whether the amount of fluctuation $\Delta P$ is greater than a specific value $P_B$ that is an amount of fluctuation of the air pressure measured when the waterproof cap 3 or 4 or the battery cap 5 is open (operation S105).

When the mobile terminal device 1 determines that the calculated amount of fluctuation $\Delta P$ of the air pressure is equal to or less than the specific value $P_B$ (operation S105: No), the mobile terminal device 1 notifies the user the fact that the waterproof cap 3 or 4 or the battery cap 5 is not fitted normally by issuing a warning (operation S106). Next, the mobile terminal device 1 ends the operation of the air pressure sensor 8 and finishes the measuring of the air pressure of the housing inside 1d (operation S107), and the processing is finished.

Conversely, if the mobile terminal device 1 determines that the mobile terminal device 1 is not being operated by the user (operation S102: No), the processing is finished. Moreover, if the mobile terminal device 1 determines that the amount of fluctuation $\Delta P$ is greater than the specific value $P_B$ (operation S105: Yes), the processing is finished.

As described above, the mobile terminal device 1 uses the air pressure sensor 8 to measure the air pressure of the housing inside 1d. The mobile terminal device 1 further detects whether the housing inside 1d is sealed based on changes (amount of fluctuation) in the air pressure when the user is performing an operation. The mobile terminal device 1 then notifies the user of the detection result.

As a result, the mobile terminal device 1 is able to notify the user whether or not the waterproof cap 3 or 4 is securely fitted. Moreover, since the mobile terminal device 1 uses the air pressure sensor 8 that is used as an altimeter or for weather forecasting for measuring the air pressure of the housing inside 1d, the mobile terminal device 1 is able to determine whether or not the waterproof cap 3 or 4 is securely fitted without increasing the size of the device.

The mobile terminal device 1 determines that the housing inside 1d is not sealed when the amount of fluctuation of the air pressure measured within the certain time period is smaller than a specific value. As a result, the mobile terminal device 1 is able to accurately determine if the housing inside 1d is sealed or not.

Moreover, the mobile terminal device 1 sets the amount of fluctuation of the air pressure in the housing inside 1d when the waterproof caps 3 and 4 and the battery cap 5 are not sealed as the specific value. That is, the mobile terminal device 1 determines that the housing inside 1d is not sealed when the amount of fluctuation of the air pressure measured within a certain time period is less than the amount of fluctuation of the air pressure in the housing inside 1d when the waterproof cap 3 or 4 or the battery cap 5 is open. As a result, the mobile terminal device 1 is able to accurately determine whether the housing inside 1d is sealed or not regardless of the surrounding environment.

For example, if the specific value is not set appropriately, the mobile terminal device 1 may falsely determine that the housing inside 1d is sealed when the mobile terminal device 1 is used in a location where the amount of fluctuation of the atmospheric pressure is large even though the housing inside 1d is not sealed. As a result, the mobile terminal device 1 measures the amount of fluctuation of the atmospheric pressure in a location that the mobile terminal device 1 is being used and sets the measurement result as the specific value in order to determine whether the housing inside 1d is sealed or not. Consequently, the mobile terminal device 1 uses the specific value based on the amount of fluctuation of the air pressure in accordance with the surrounding environment to determine whether or not the housing inside 1d is sealed and thus is able to reduce a false determination.

Moreover, when the mobile terminal device 1 detects that the mobile terminal device 1 is being operated by the user, the mobile terminal device 1 starts to measure the air pressure of the housing inside 1d. As a result, the mobile terminal device 1 is able to reduce power consumption. That is, the air pressure sensor 8 measures the air pressure at a sampling rate higher than a sampling rate for calculating the altitude in order to measure the fluctuation of the air pressure while being operated by the user. As a result, the power consumption of the mobile terminal device 1 increases when the air pressure sensor 8 is being constantly operated. However, since the mobile terminal device 1 activates the air pressure sensor 8 upon an operation, such as creating an email message, of the mobile terminal device 1 by the user to measure the fluctuation of the air pressure while the user is operating the mobile terminal device 1, the mobile terminal device 1 is able to reduce power consumption.

Second Embodiment

The embodiments explained up to this point may be implemented in various different forms other than the abovementioned embodiments. Another embodiment included in the present disclosure will be described hereinbelow as the second embodiment.

(1) Variation in Processing

The mobile terminal device 1 has been described in the abovementioned first embodiment as measuring the air pressure of the housing inside 1d upon receiving an operation by the user. However, the embodiment is not limited as such. For example, the mobile terminal device 1 may not measure the air pressure when a function to be used when the waterproof cap 3 is open is in operation such as when recharging or when sending or receiving data through the USB, and thus the power consumption may be reduced further. Moreover, the mobile terminal device 1 may not measure the air pressure when a function to be used when the waterproof cap 4 is open is in operation such as a music player or a communication or video browsing application, thus the power consumption may be reduced further.

Figure 9:
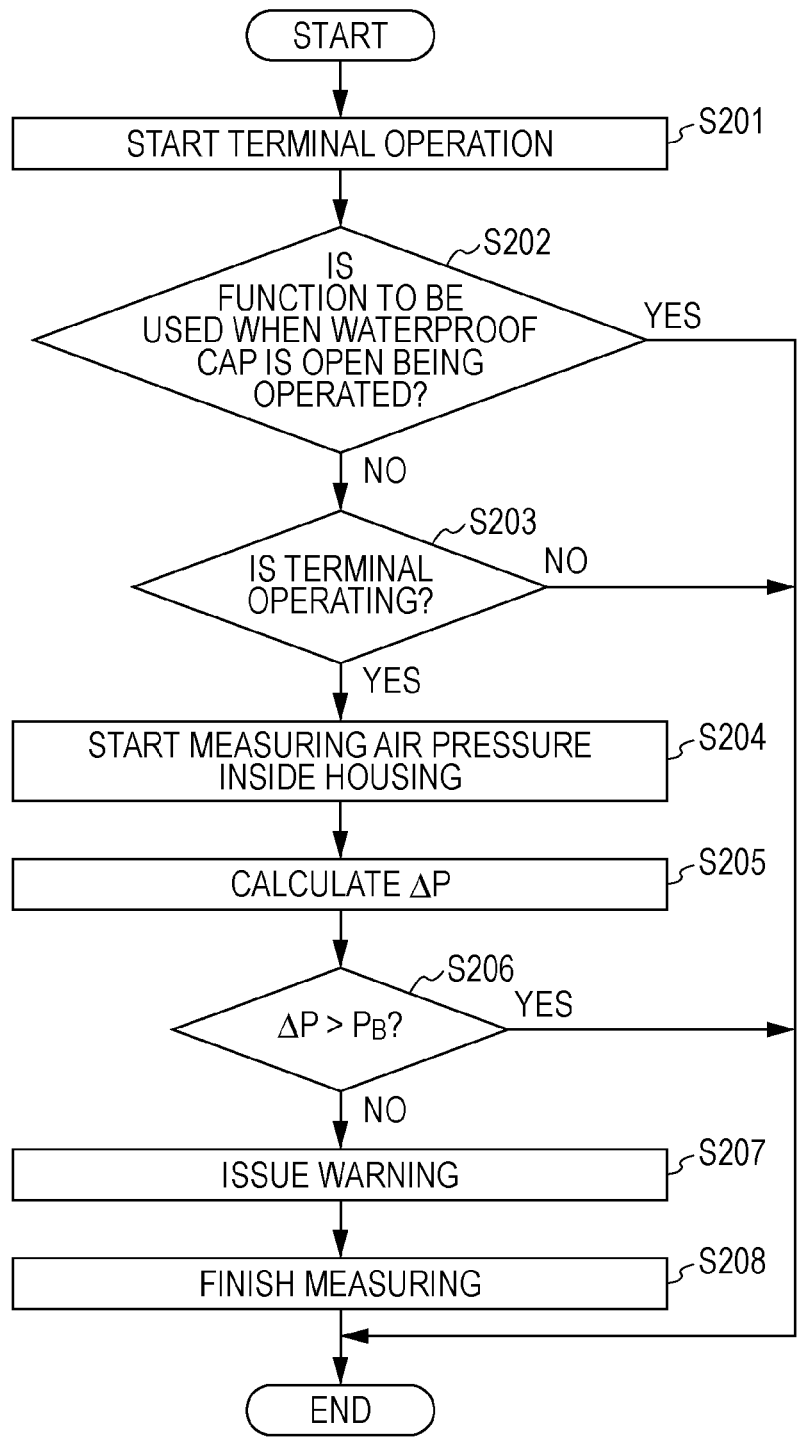
FIG. 9 is a flow chart describing a variation in processing executed by the mobile terminal device.

A description of a variation in the processing executed by the mobile terminal device 1 will be described with reference to FIG. 9. FIG. 9 is a flow chart describing a variation in processing executed by the mobile terminal device. Operations S201 and S203 to S208 in the processing described in FIG. 9 are the same as operations S101 to S107 in FIG. 8, and explanations thereof will be omitted.

For example, when an operation of the mobile terminal device 1 is started by the user (operation S201), the mobile terminal device 1 determines whether a function to be used when the waterproof cap 3 or 4 is open is being operated (operation S202). To provide a detailed example, the mobile terminal device 1 identifies the applications being operated through a task manager and the like, and determines whether the identified applications include an application to be used when the waterproof cap 3 or 4 is open.

When a function to be used when the waterproof cap 3 or 4 is open is being operated (operation S202: Yes), the mobile terminal device 1 then finishes the processing without activating the air pressure sensor 8. Conversely, if a function to be used when the waterproof cap 3 or 4 is open is not being operated (operation S202: No), operation S203 is then executed.

In this way, the mobile terminal device 1 determines whether a function to be used when the waterproof cap 3 or 4 is open is being operated, and the air pressure of the housing inside 1d is measured only when a function to be used when the waterproof cap 3 or 4 is open is not being operated. As a result, the mobile terminal device 1 is able to further reduce power consumption.

(2) Calculation of the Amount of Fluctuation $\Delta P$

When the amount of fluctuation $\Delta P$ of the air pressure measured by the air pressure sensor 8 is less than the specific value $P_B$, the abovementioned mobile terminal device 1 issues a warning to the user that the waterproof cap 3 or 4 or the battery cap 5 is not fitted. However, the embodiment is not limited as such.

For example, the mobile terminal device 1 activates the air pressure sensor 8 to measure the air pressure of the housing inside 1d at a certain sampling rate during a certain time period $\Delta t$. The mobile terminal device 1 calculates the amount of fluctuation $\Delta P$ of the air pressure from the measured air pressure, and when a value $\Delta P_A$ that is the amount of fluctuation $\Delta P$ divided by $\Delta t$ is less than the specific value $P_B$, the mobile terminal device 1 issues a warning to the user that the waterproof cap 3 or 4 or the battery cap 5 is not fitted.

Moreover, the mobile terminal device 1 measures the air pressure of the housing inside 1d a plurality of times at different timings and then calculates the amount of fluctuation $\Delta P$ of the air pressure from the measured air pressures. When the value $\Delta P_A$ that is the amount of fluctuation $\Delta P$ divided by $\Delta t$ is less than the specific value $P_B$, the mobile terminal device 1 may issue a warning to the user that the waterproof cap 3 or 4 or the battery cap 5 is not fitted.

Furthermore, the mobile terminal device 1 may use a value other than a fluctuation of the air pressure of the housing inside 1d measured when the waterproof cap 3 or 4 is open, as the specific value $P_B$. For example, the mobile terminal device 1 measures the air pressure of the housing inside 1d for the certain time period and then determines whether the atmospheric pressures of the housing inside 1d and of the outside housing have settled into a state of equilibrium from the measured air pressure values. When the mobile terminal device 1 determines that the atmospheric pressures of the housing inside 1d and from outside of the housing have settled into a state of equilibrium, the mobile terminal device 1 measures the amount of fluctuation of the air pressure in the housing inside 1d and may use the measured amount of fluctuation of the air pressure as the specific value $P_B$. The mobile terminal device 1 may also calculate the specific value $P_B$ based on amounts of fluctuation of the air pressure measured a plurality of times. The mobile terminal device 1 may also correct the values of the amount of fluctuation $\Delta P$, the amount of fluctuation $\Delta P_A$, and the specific value $P_B$ in consideration of the temperature or the altitude and the like.

The mobile terminal device 1 may detect that the waterproof caps 3 or 4 or the battery cap 5 are not sealed in order to measure the amount of fluctuation of the air pressure while the waterproof caps 3 or 4 or the battery cap 5 are not sealed. That is, when the amount of fluctuation $\Delta P$ of the air pressure is less than the specific value, the mobile terminal device 1 may detect that the waterproof caps 3 or 4 or the battery cap 5 are not sealed, and in such a case, may measure the air pressure and calculate the value of the specific value $P_B$.

For example, if the waterproof caps 3 and 4 are open, the mobile terminal device 1 may determine that the housing inside 1d is not sealed. For example, when ear phones, a USB connector, or a recharging connector is inserted into any of the terminals, the mobile terminal device 1 may determine that the waterproof cap 3 or 4 is open.

Furthermore when, for example, an application to be executed when ear phones, a USB connector, or a recharging connector is inserted into any of the terminals is being executed, the mobile terminal device 1 may determine that the waterproof cap 3 or 4 is open. When the waterproof cap 3 or 4 is detected as being open, the mobile terminal device 1 may measure the air pressure of the housing inside 1d and set the measured value as the specific value $P_B$.

(3) Air Pressure Sensor 8

The abovementioned mobile terminal device 1 has the air pressure sensor 8 used as an altimeter and used for weather forecasting. However, the embodiment is not limited as such. For example, the mobile terminal device 1 may have an air pressure sensor for determining whether or not the waterproof cap 3 and the like is fitted instead of the air pressure sensor used as the altimeter or for weather forecasting.

Figure 10:
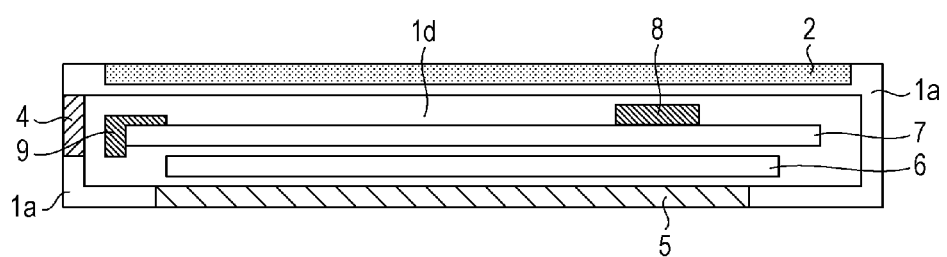
FIG. 10 illustrates an example of an internal configuration of the mobile terminal device according to a second embodiment.

For example, FIG. 10 illustrates an example of an internal configuration of the mobile terminal device according to the second embodiment. As illustrated in FIG. 10, the mobile terminal device 1 may not have the vent hole 1b or the waterproof film is and may not have the function for an altimeter or for weather forecasting. That is, the air pressure sensor 8 may be installed in the housing inside 1d so that the mobile terminal device 1 is able to determine whether the waterproof cap 3 is fitted normally.

Moreover, the mobile terminal device 1 activates the air pressure sensor 8 to measure the air pressure of the housing inside 1d upon receiving an operation by the user. However, the embodiment is not limited as such. For example, the mobile terminal device 1 may normally activate the air pressure sensor 8 at a first sampling rate that is desired for enabling the altimeter or the weather forecasting function.

When the mobile terminal device 1 determines that the terminal is being operated by the user, the mobile terminal device 1 activates the air pressure sensor 8 to measure the air pressure of the housing inside 1*d* at a second sampling rate with a value higher than the first sampling rate. Then, the mobile terminal device 1 may reduce the amount of power consumption by returning the sampling rate of the air pressure sensor 8 to the first sampling rate.

(4) Other

The abovementioned functions of the mobile terminal device 1 may be used for inspections such as sealing state inspections, for example, to determine if a crack is present in the housing is in addition to determining whether the waterproof caps are fitted securely. For example, a user presses the touch panel 2 to apply a force to the mobile terminal device 1 while covering the vent hole 1*b* with a finger during a shipment inspection of the mobile terminal device 1. In this case, the mobile terminal device 1 uses the air pressure sensor 8 to measure the air pressure of the housing inside 1*d* and may display the fact that the product is abnormal on the touch panel 2 if the amount of fluctuation of the measured air pressure exceeds a specific value. By executing this processing, the mobile terminal device 1 may easily be subject to a product inspection for shipping.

Moreover, the abovementioned mobile terminal device 1 determines whether the waterproof caps 3 and 4 and the battery cap 5 are fitted normally in accordance with the amount of fluctuation of the air pressure of the housing inside 1*d* measured when the touch panel 2 is operated by the user. However, the embodiment is not limited as such. That is, if the mobile terminal device 1 has a physical button or other optional input device, the mobile terminal device 1 may make the determination in accordance with the amount of fluctuation of the air pressure of the housing inside 1*d* measured when the user operates the optional input device.

(5) Program

Figure 11:
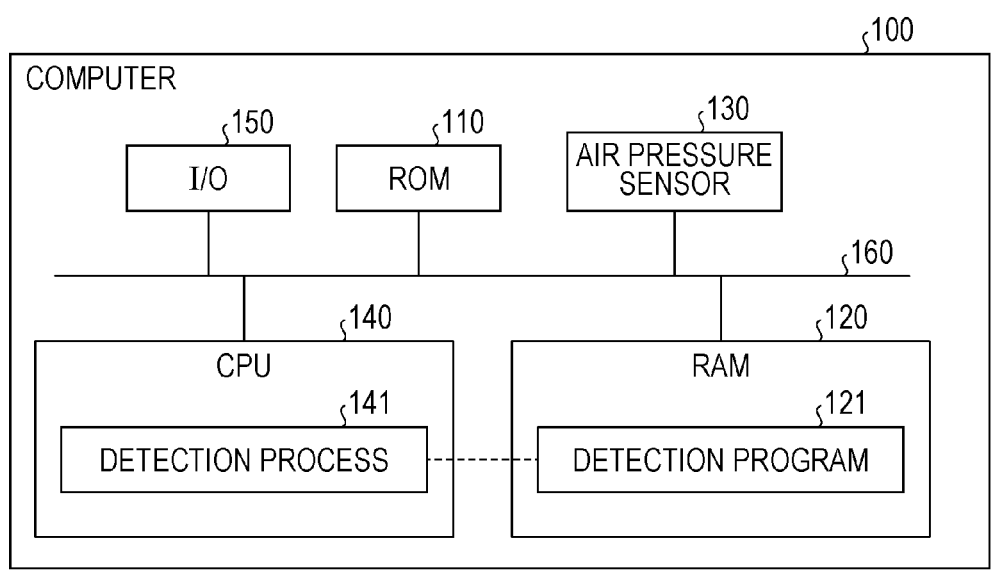
FIG. 11 illustrates an example of a computer for executing a detection program.

The functions demonstrated by the mobile terminal device 1 described in the above embodiments may be realized by a computer in the mobile terminal device 1 that executes a previously prepared detection program. An example of a computer of the above mobile terminal device 1 executing a detection program that has the same functions is described hereinbelow with reference to FIG. 11. FIG. 11 illustrates an example of a computer for executing a detection program.

A computer 100 exemplified in FIG. 11 has a read-only memory (ROM) 110, a random access memory (RAM) 120, an air pressure sensor 130, and a central processing unit (CPU) 140 interconnected with a bus 160. The computer 100 exemplified in FIG. 11 has an input/output (I/O) 150 connected to the CPU 140 with the bus 160.

A detection program 121 is previously held in the RAM 120. The CPU 140 reads and executes the detection program 121 from the RAM 120 so that the detection program 121 functions as a detection process 141 in the example illustrated in FIG. 11. The detection process 141 demonstrates the same functions as the receiving unit 11, the measuring unit 12, the detecting unit 13 and the output unit 14 illustrated in FIG. 4.

The detection program described in the present embodiment may be realized by executing a program prepared in advance using a computer such as a personal computer or a workstation. Such a program may be distributed to the computer through a communication network such as the internet and the like. The program is recorded onto a computer-readable recording medium such as a hard disk, a flexible disk (FD), a compact disk read-only memory (CD-ROM), a magnetic-optical disk (MO), or a digital versatile disk (DVD) and the like. The program may be executed by the computer by being read from the recording medium.

The computer 100 may use an arithmetic device such as a MPU or a FPGA instead of the CPU to execute the detection program 121. Moreover, the above detection program 121 may be saved onto the RAM 120 or the ROM 110, for example, and may be executed by the CPU 140 with another method. For example, the programs may be stored on a "portable physical medium" such as a flexible disk (FD), a compact disk read-only memory (CD-ROM), a digital versatile disk (DVD), a magnetic-optical disk (MO), or an IC card and the like.

The computer 100 then may obtain the programs from the portable physical medium and execute the programs. Moreover, the programs may be stored on another computer or a server device and obtained through a public telephone line, the Internet, a LAN, or a wide area network (WAN) and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal device comprising:
    an external connector configured to connect to an external device;
    a housing having an opening that is closeable and openable for access to the external connector;
    an input device attached to the housing, an operation of the input device changing a volume of space within the housing;
    a measuring unit configured to measure an air pressure inside the housing;
    a detecting unit configured to detect the housing being sealed based on an amount of fluctuation of the air pressure measured by the measuring unit remaining larger than a specific value within a certain time period while the input device is being operated; and
    a notifying unit configured to notify the user of a detection result of the detecting unit.

2. The mobile terminal device according to claim 1, wherein the detecting unit detects that the housing is not sealed when the amount of fluctuation of the air pressure measured within the certain time period is smaller than the specific value.

3. The mobile terminal device according to claim 2, wherein the amount of fluctuation of the air pressure measured by the measuring unit in a state in which an openable and closeable lid member provided on the housing is not sealed is set as the specific value.

4. The mobile terminal device according to claim 1, wherein the measuring unit starts measuring the air pressure inside the housing when an operation by the user is detected.

5. A mobile terminal device, comprising:
    a housing;
    a measuring unit configured to measure an air pressure inside the housing;

a detecting unit configured to detect whether the housing is sealed based on a change in the air pressure measured by the measuring unit while an operation is being conducted by a user; and a notifying unit configured to notify the user of a detection result of the detecting unit, wherein the measuring unit does not measure the air pressure inside the housing when a function to be used when an openable and closeable lid member provided on the housing is open is being operated, and measures the air pressure inside the housing when a function to be used when the openable and closeable lid member provided on the housing is open is not being operated.

6. A non-transitory computer-readable recording medium storing a program that cases a computer to execute a procedure, the procedure comprising:

measuring an air pressure inside a housing having an opening that is openable and closeable for access to an external connector configured to connect to an external device, and the housing having an input device attached that changes a volume of space within the housing when the input device is operated;

detecting the housing is sealed based on an amount of fluctuation of the measured air pressure remaining larger than a specific value within a certain time period while the input device is being operated; and notifying the user of a result of the detecting.

7. A sealing detection method comprising:

measuring an air pressure inside a housing of a mobile terminal device, the housing having an opening that is openable and closeable for access to an external connector configured to connect to an external device, and the housing having an input device attached that changes a volume of space within the housing when the input device is operated;

detecting the housing is sealed based on an amount of fluctuation of the measured air pressure remaining larger than a specific value within a certain time period while the input device is being operated; and notifying the user of a result of the detecting.

\* \* \* \* \*